United States Patent
Eberle

(12) 
(10) Patent No.: US 7,342,200 B2
(45) Date of Patent: Mar. 11, 2008

(54) TORCH FOR ARC WELDING

(75) Inventor: Garr C. Eberle, Parma, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 11/168,750

(22) Filed: Jun. 28, 2005

(65) Prior Publication Data

US 2006/0289413 A1   Dec. 28, 2006

(51) Int. Cl.
   *B23K 9/173* (2006.01)
(52) U.S. Cl. ............................................. 219/137.31
(58) Field of Classification Search ........... 219/137.31, 219/137.42
   See application file for complete search history.

(56) References Cited

U.S. PATENT DOCUMENTS

| | | | | |
|---|---|---|---|---|
| 3,155,811 A | * | 11/1964 | Adamson et al. | 219/137.44 |
| 3,469,070 A | * | 9/1969 | Bernard et al. | 219/137.31 |
| 4,158,763 A | * | 6/1979 | Moerke | 219/137.42 |
| 4,731,518 A | * | 3/1988 | Parmelee et al. | 219/137.31 |

* cited by examiner

*Primary Examiner*—Kevin P. Kerns
(74) *Attorney, Agent, or Firm*—Fay Sharpe LLP

(57) ABSTRACT

A welding torch has a nozzle; a contact tip positioned within the nozzle; a tube extending from the nozzle; wherein the tube has a gooseneck portion having a radius, and the tube has a second portion adjacent the nozzle which has a longitudinal axis which is substantially collinear with a longitudinal axis of the nozzle. The gooseneck tube has a single radius extending from a distal portion to a proximal portion of the tube.

15 Claims, 4 Drawing Sheets

… (1)

TORCH FOR ARC WELDING

BACKGROUND

A substantial amount of arc welding is now done industrially by the use of robotic and automatic welding equipment wherein a supply of welding wire is pulled from a drum by a wire feeder and pushed through a welding cable and then through a welding gun movable along a workpiece. The robot performs a continuous welding operation. The welding torch includes a tubular contact tip allowing a welding current to be conducted to the wire moving through a wire receiving passage in the contact tip so the current between the wire and workpiece melts the wire for deposition of the metal onto the workpiece. This robotic or automatic type welding equipment operates continuously over many hours repeating the same welding operation. Thus, it is essential that the moving welding wire be provided to the welding operation while advancing at the desired rate coordinated with the controlled rate of movement between the electrode or wire and the workpiece. Accordingly, smooth, controlled feeding of electrode wire into the welding torch is an essential part of the welding operation.

Existing designs of Flux Cored Self Shielded (FCAW-S) semi-automatic guns use a reverse bend in the gun tube (nozzle assembly) to increase pressure at the contact tip. The reverse bend is typically placed within the last three inches of the nozzle assembly behind the contact tip and is in addition to a bend of 0 to 90 degrees in a gooseneck position placed farther away from the contact tip behind the reverse bend. An increase in pressure between the electrode and contact tip will typically produce a more consistent arc in some cases. However, increasing pressure between the electrode and the contact tip also creates more drag on the electrode as it is fed through the gun. This is usually not a problem and can be a benefit to some of the stiffer, larger diameter FCAW-S electrodes. As FCAW-S electrodes have evolved, however, the diameters have become smaller and the sheaths (i.e., metal jackets) have become thinner. This results in the electrode losing rigidity and becoming more susceptible to feeding problems. Common feeding problems include slipping at the drive rolls that feed the electrode or buckling of the electrode after it leaves the drive rolls. A reverse bend near the contact tip can also make feeding of a smaller and less rigid electrode more difficult due to bending or kinking of the electrode wire as it is fed through the bend.

Thus, it is considered desirable to provide a nozzle assembly for a welding torch without a reverse bend to overcome the above-mentioned deficiencies and others while providing better, more advantageous results.

SUMMARY OF THE INVENTION

This invention pertains to the art of electric arc welding and, more particularly, to a gun and nozzle assembly for feeding an electrically energized wire electrode to a workpiece to be welded.

In the field of metal arc welding, it is conventional to provide: a self-shielded gun through which a steel wire electrode is fed towards a workpiece; an electrical power source; a wire feeder; and a heavy cable interconnecting the gun to the power source and the wire feeder.

The welding gun typically includes a handle at one end of an elongated barrel through which the electrode must freely pass.

The handle normally includes a trigger which actuates a microswitch which in turn controls electrical circuits which turn on the electrical power source.

An alternate gun can be provided which has a nozzle for gas shielding which is fed coaxially with the wire electrode towards a workpiece.

In accordance with one aspect of the invention, a welding torch has a nozzle; a contact tip positioned within the nozzle; a tube extending from the nozzle; wherein the tube has a first gooseneck portion having a radius, and the tube has a second portion adjacent the nozzle which has a longitudinal axis which is substantially collinear with a longitudinal axis of the nozzle.

In accordance with another aspect of the invention, a welding torch has a handle; a nozzle; and, a gooseneck tube having a proximal end and a distal end; wherein the nozzle is attached to the distal end and the handle is secured to the proximal end. The gooseneck tube has a single radius extending from the distal portion to the proximal portion.

In accordance with still another aspect of the invention, a welding torch has a nozzle; a handle; and, a gooseneck portion extending between the handle and the nozzle, wherein the gooseneck portion forms a chord of a circle about a single point.

In accordance with yet another aspect of the invention, a welding torch has a nozzle; a contact tip positioned within the nozzle; a handle; and, a tube extending between the nozzle and the handle, the tube comprises a single radius extending between the nozzle and the handle about a single point.

In accordance with another aspect of the invention, a welding torch has a contact tip; a handle; and, a gooseneck portion extending between the contact tip and the handle, wherein the gooseneck portion comprises a single radius extending between the contact tip and the handle.

Other aspects of the invention will become apparent to those skilled in the art upon a reading and understanding of the following detailed description.

BRIEF DESCRIPTION OF THE DRAWINGS

Further aspects of the invention will become apparent by reference to the detailed description when considered in conjunction with the figures, wherein like reference numbers indicate like elements through the several views, and wherein.

DETAILED DESCRIPTION

Figure 1:
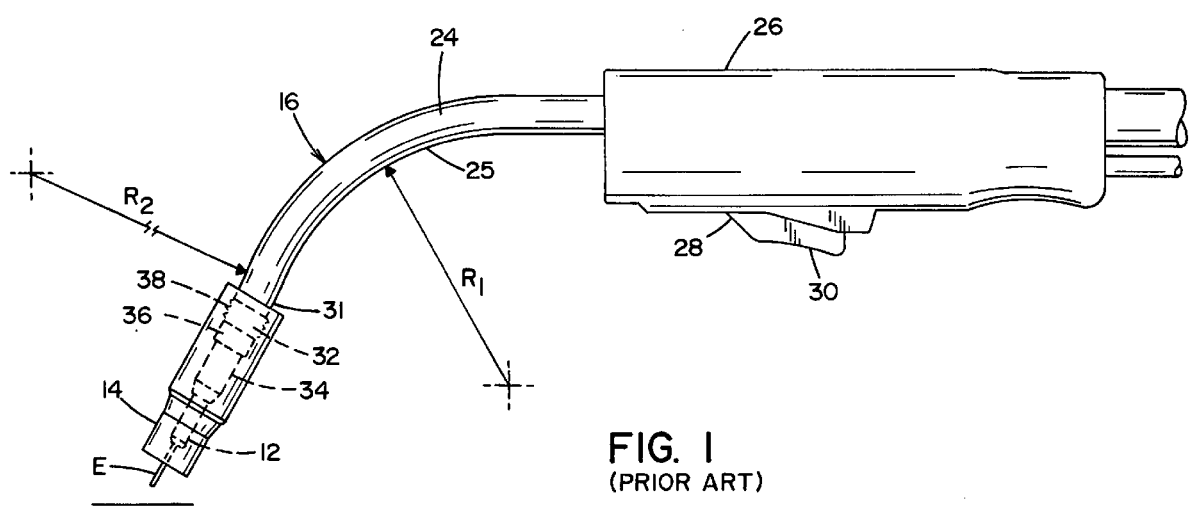
FIG. 1 is a perspective view of a prior art welding gun having a reverse bend in the nozzle.

Referring to FIG. 1, a prior art welding gun nozzle is shown having a reverse bend in the nozzle on an end of a nozzle tube which extends to the left in an arcuate manner to guide the electrode E and shielding gases to a contact tip 12 and a gas nozzle 14. This gun assembly is shown and described in U.S. Pat. No. 4,731,518, which is hereby incorporated by reference. A gooseneck tube 16 is formed of high conductivity copper material and is generally cylindrical in its external shape, although it may be any shape. The tube 16 can have an internal non-cylindrical passage such as a polygonal shape, preferably square. Inside of the passage is a cylindrical steel tube and a cylindrical electrode wire guide formed of an elongated helix of spring steel wire having an outer diameter generally equal to the smallest transverse dimension of the passage. With the cylindrical configuration of tube and guide and the non-cylindrical e.g. polygonal configuration of the passage shown, there is ample clear space for gas flow from the handle through the nozzle tube to the gas nozzle 14. The inner diameter of the guide is such as to appropriately mate with the size of the electrode E to be moved therethrough.

The outer surface of the tube 16 is encased in an insulating coating 24 as is conventional. The gooseneck tube 16 has curved portion 25 with a radius $R_1$ as it leaves handle 26 housing a switch 28 having an operating button 30, terminating in short portion 31 with a reverse radius $R_2$.

The exit end of the nozzle tube 16 is counterbored and threaded to receive the threaded end of a gas diffuser 34 which when threaded into position holds a sleeve 36 surrounding the exit end of the nozzle tube by means of a flange on the end of sleeve being engaged by a shoulder on the gas diffuser. An outer surface of another sleeve 32 is threaded as at 38 to mate with internal threads on nozzle 14.

The gas diffuser 34 has an entrant internal passage greater than the diameter of the electrode E, and a plurality of radial passages extending from this passage through which gases can flow into the interior of the gas nozzle. The lower end of the gas diffuser can be counterbored and threaded to threadably receive contact tip 12 coaxial with the gas nozzle and terminating at its exit end short of the lower or exit end of the gas nozzle. The contact tip has a passage therethrough of a diameter just slightly greater than the diameter of the electrode E with which the gun is to be used. Because of the reverse radius $R_2$, the electrode E is biased against one side of the contact tip 12 to provide electrical contact with the electrode E at a fixed point close to where the electrode exits the tip 12. While electrical contact may be enhanced due to the reverse bend radius $R_2$, feeding of the electrode through the gun may be inhibited.

Electrodes over the years have been developed which have smaller diameters and have thinner metal sheaths or jackets. As a result, the electrodes are less rigid and are more susceptible to feeding and binding problems. Common feeding problems are slipping at the drive rolls that feed the electrode or buckling of the electrode right after the drive rolls. By removing the reverse bend in the nozzle, feeding of the electrode is improved and bending is reduced.

Performance of a torch assembly depends on several factors, such as electrode diameter, stiffness, and surface condition. For larger diameter and stiffer electrodes, a gooseneck bend in the range of 0 to 68 degrees with a reverse bend adjacent the contact tip will give the best combination of feeding and arc stability. For smaller diameter and less rigid electrodes, a nozzle assembly with a goose-neck bend in the range of 30 to 90 degrees without a reverse bend will result in an optimum performance.

Figure 2:
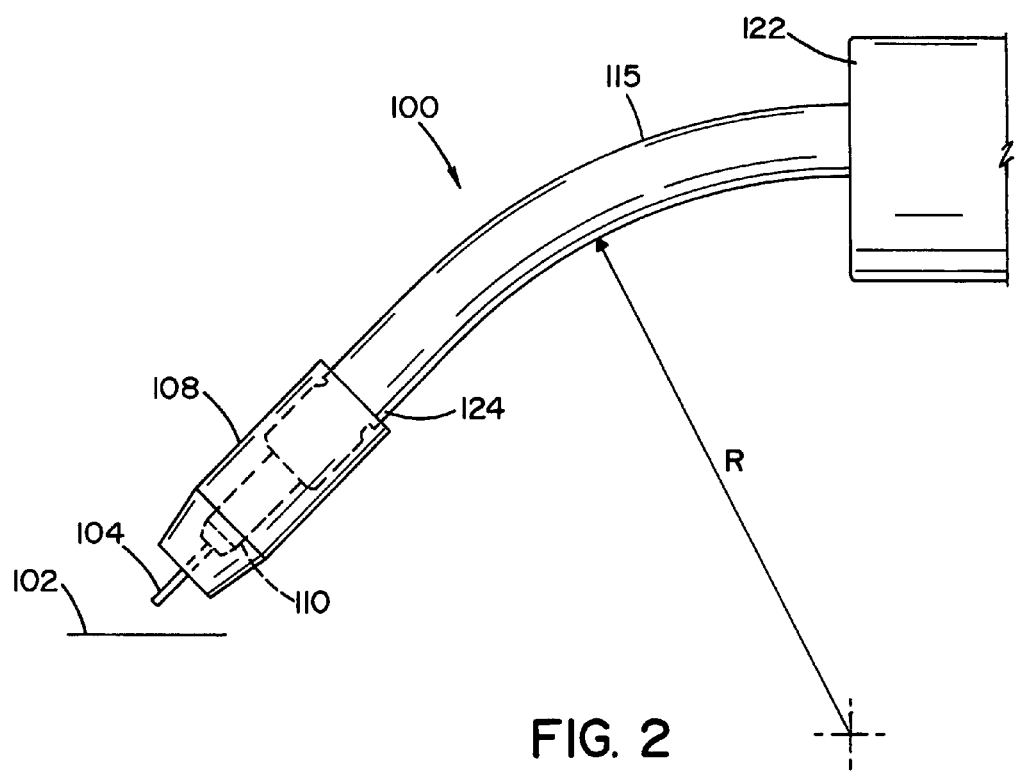
FIG. 2 is a perspective view of a welding torch with a shielding gas nozzle without a reverse bend in accordance one embodiment of the present invention; and, FIG. 3 is an enlarged cross-sectional view of the welding torch without a reverse bend of FIG. 2; and, FIG. 4 is an enlarged cross-sectional view of a self-shielded welding torch without a reverse bend in accordance with another embodiment of the present invention.

Referring now to FIG. 2, a schematic view of a welding system in accordance with a preferred embodiment of the present invention is shown. While the invention will be described herein with reference to self-shielded or gas shielded welding guns or torches.

Referring to FIG. 2, a gas-shielded welding torch 100 without a reverse bend is shown in position above a Workpiece 102 which is typically connected by means of a ground wire to a welding power supply (not shown). The welding torch 100 is typically supplied with electrode wire 104 from a wire supply reel via a control system. The control system not only regulates the rate at which welding wire 104 moves into the torch, but it can also regulate the flow of shielding gas from a gas source.

Figure 3:
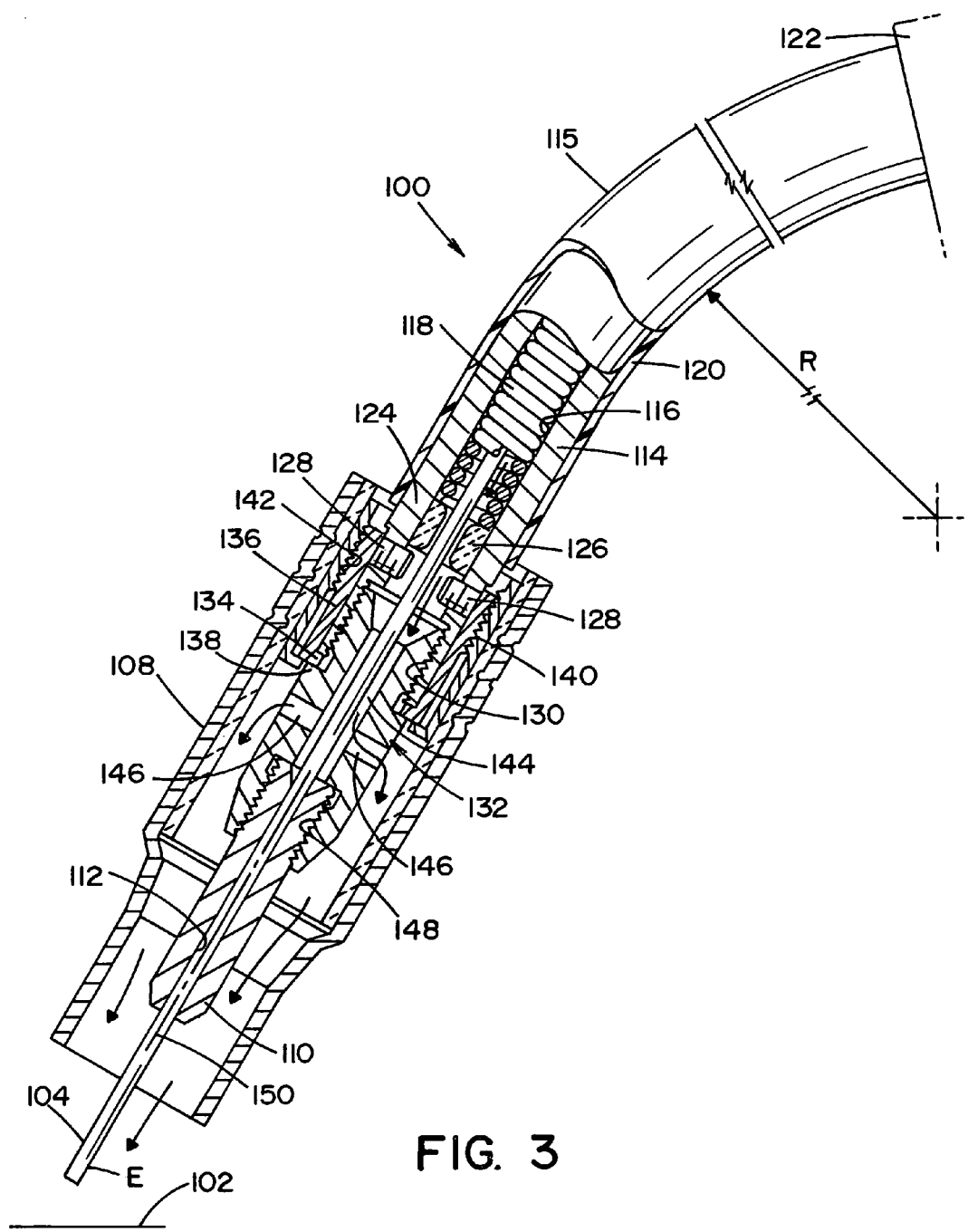

Nozzle 108, shown in detail in FIG. 3, includes a contact tip 110 having formed therein a passageway 112 through which welding wire 104 is directed into the weld.

Gooseneck tube 114 is preferably formed of high conductivity copper material and is generally cylindrical in its external shape, although it may be any suitable shape. The tube has an internal non-cylindrical passage 116 such as a polygonal shape, preferably square. Inside of the passage is a cylindrical steel tube and a liner or cylindrical electrode wire guide 118 formed of an elongated helix of spring steel wire having an outer diameter generally equal to the smallest transverse dimension of the passage.

The outer surface of the tube 114 is encased in an insulating coating 120 as is conventional. The gooseneck tube 114 has a radius R as it leaves a handle 122 terminating in short portion 124. Curved portion 115 of the gooseneck extends between the handle 122 and the nozzle 108. The gooseneck, as can be seen in FIG. 3, has a single radius R extending between a proximal end adjacent the handle and a distal end adjacent the nozzle.

Positioned adjacent the exit end of the nozzle tube in the polygonal passage 116 is a cylindrical ceramic guide 126 which abuts against the left hand or exit end of the guide 118 and is held in place by a pair of setscrews 128.

The ceramic guide 126 has a cylindrical outer surface to permit the passage of the shielding gases thereby in the spaces provided by the square shape of the bore and a central opening through which electrode E passes.

The left hand or exit end of the nozzle tube is counterbored and threaded as at 130 to receive the threaded end of a gas diffuser 132 which when threaded into position holds a sleeve surrounding the left hand or exit end of the tube 114 by means of a flange 134 on the end of sleeve 136 being engaged by a shoulder 138 on the gas diffuser 132. The outer surface of the sleeve 136 is threaded as at 140 to mate with internal threads 142 on the nozzle.

The gas diffuser 132 has an entrant internal passage 144 greater than the diameter of the electrode wire E, and a plurality of radial passages 146 extending from this passage through which gases can flow into the interior of the gas nozzle. The lower end of the gas diffuser 132 is counterbored and threaded as at 148 to threadably receive contact tip 110 coaxial with the gas nozzle and terminating at its exit end short of the lower or exit end of the gas nozzle. The contact tip has a passage 112 therethrough of a diameter just slightly greater than the diameter of the electrode wire E with which the gun is to be used.

The gun further includes a handle 122 with a microswitch mounted thereon having an operating button which must be depressed.

Referring still to FIG. 3, adjacent the contact tip of the nozzle, the gooseneck tube does not have a reverse bend as does the nozzle of FIG. 1. Rather, the gooseneck tube extends so that the contact tip and the short portion 124 of the tube has a longitudinal axis substantially collinear with longitudinal axis 150 of the contact tip. Thus, no reverse bend is present.

By not having a reverse bend, pressure between the electrode and contact tip is reduced, thus reducing drag on the electrode as it is fed through the gun.

The nozzle assembly that delivers the best performance can vary depending on many factors. Some of the factors are electrode diameter, stiffness, and surface condition. For smaller diameter and less rigid electrodes a 30 to 90 degree nozzle assembly without a reverse bend will give the best performance. For larger diameter and stiffer electrodes a 0 to 68 degree nozzle assembly with a slight reverse bend will give the best combination of feeding and arc stability. Thus, a slight reverse bend may be permissible without adversely affecting the feeding of wire through the nozzle.

Figure 4:
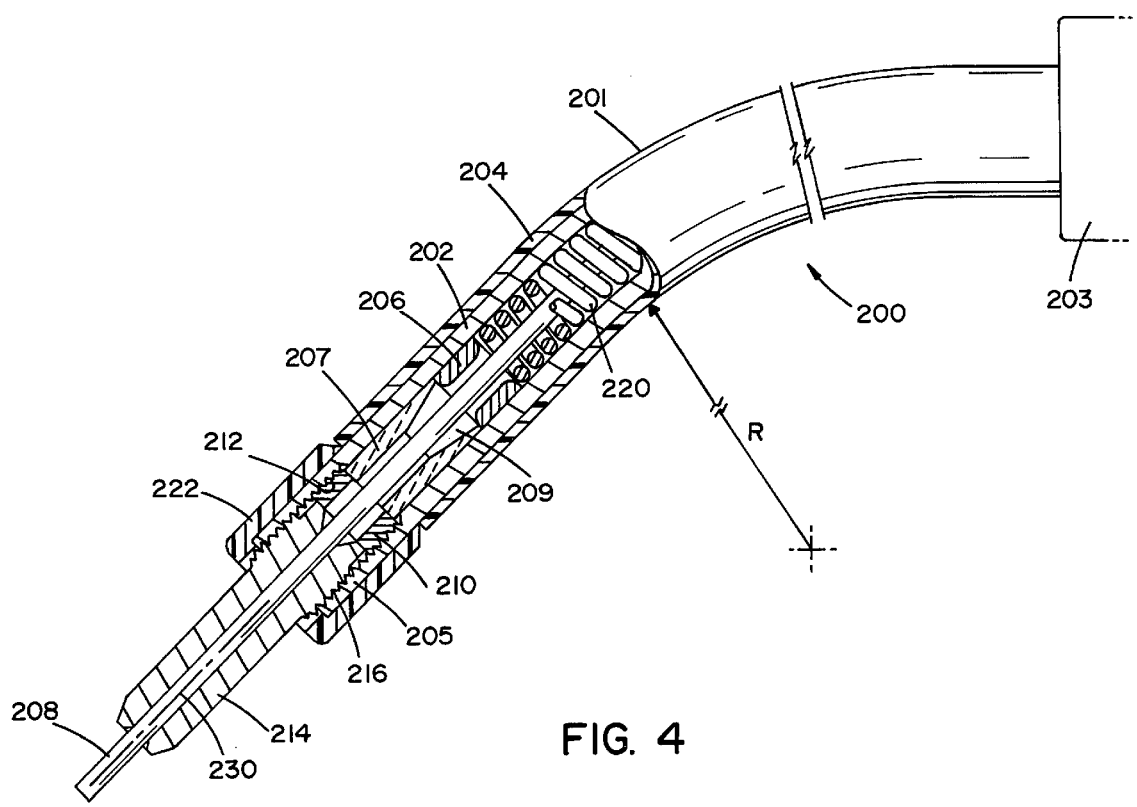

Referring now to FIG. 4, a flux core self-shielded (FCAW-S) semi-automatic welding gun 200 without a reverse bend in accordance with another embodiment of the present invention is shown. The welding gun 200 has a tube 202 over which a nozzle sleeve 204 is formed. A gooseneck portion 201 of the tube extends from a handle portion 203 to an end 205 of tube 202 and has a single radius R extending between a proximal end adjacent the handle and distal end 205.

A nozzle insert 206 is positioned within the tube and is retained in position by nozzle insert retainer 207. The insert is preferably fabricated from metal and is used to guide electrode wire 208 through the nozzle. The insert retainer preferably is formed of ceramic material and has an opening 209 which tapers from the inner diameter of the tube to the diameter of hollow lock screw 210. Screw 210 is threaded into a threaded opening 212 in the tube. Contact tip 214 from the tube end is threaded into position by mating threads 216 on an outer diameter of the contact tip with threads 212 on the tube 202. The nozzle insert 206 abuts the retainer 207 and acts as a guide to permit passage of the electrode wire through a central opening thereof.

As is commonly known in the art, a liner or spring assembly 220 can surround the wire 208 within the nozzle and serves to center and position the wire within the nozzle sleeve and assist the wire in moving through the central part of the sleeve.

A thread protector sleeve 222 is secured to an end of the sleeve. The sleeve 222, which can be made of fiber material, such as plastic, is positioned over any threaded portion 216 of the contact tip 214 which extends out of the nozzle tube 202. This prevents welding spatter and other debris from forming on and causing damage to the contact tip threads. Various sizes and lengths of sleeves 222 can be used and secured to the nozzle in a variety of ways, such as crimping, threading, etc.

The tube has a radius R as it leaves the handle portion of the torch. The bend in the tube is approximately 45°. The tube does not have a reverse bend $R_2$, as shown in FIG. 1. Rather, the tube extends so that a longitudinal axis of the tube is substantially colinear with longitudinal axis 230 of the contact tip.

Some of the factors affecting torch performance are electrode diameter, stiffness, and surface condition. For smaller diameter and less rigid electrodes a 30 to 90 degree nozzle assembly without a reverse bend will give the best performance. For larger diameter and stiffer electrodes a 0 to 68 degree nozzle assembly with a slight reverse bend will give the best combination of feeding and arc stability. Thus, a slight reverse bend may be permissible without adversely affecting the feeding of wire through the nozzle.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A welding torch, comprising:
   a nozzle;
   a contact tip positioned within said nozzle;
   a tube extending from said nozzle;
   a handle connected to said tube;
   wherein said tube has a gooseneck portion having a single radius extending from said handle to said nozzle, and said tube has a second portion adjacent said nozzle which has a longitudinal axis which is substantially collinear with a longitudinal axis of said nozzle;
   a guide member positioned adjacent an end of said second portion of said tube; and,
   a welding wire which is fed through said tube and said nozzle, said welding wire remains unbiased as it is fed through said guide member, said tube, said contact tip, and said nozzle.

2. The welding torch of claim 1, further comprising a tip holder which retains said contact tip.

3. The welding torch of claim 2, wherein said tip holder comprises a plurality of passages for flow of shielding gas.

4. The welding torch of claim 1, further comprising a liner which surrounds a portion of welding wire extending through said tube.

5. The welding torch of claim 3, wherein said tip holder comprises a threaded opening for receiving a threaded portion of said contact tip.

6. The welding torch of claim 1, wherein said gooseneck portion of said tube comprises a bend in the range of 30 to 90 degrees.

7. The welding torch of claim 1, wherein said gooseneck portion of said tube comprises a bend in the range of 0 to 68 degrees.

8. A welding torch assembly, comprising:
   a contact tip;
   a handle;
   a tube extending between said contact tip and said handle;
   a guide member located on an end of said tube;
   wherein said tube has a gooseneck portion having a single radius extending between said handle and said contact tip, and said tube has a second portion adjacent said contact tip, and a welding wire, wherein said contact tip has a longitudinal axis substantially collinear with a longitudinal axis of said tube; wherein said welding wire is unbiased against said contact tip and said guide member as said welding wire is fed through said torch assembly.

9. The welding torch of claim 8, further comprising a protective sleeve adjacent an end of said gooseneck portion and covering at least a portion of said contact tip.

10. The welding torch of claim 9, wherein said portion of said contact tip is threaded.

11. The welding torch of claim 9, wherein said guide member is positioned within said gooseneck portion and is retained by a retainer member.

12. The welding torch of claim 11, wherein said retainer member comprises a tapered opening.

13. The welding torch of claim 8, further comprising a liner surrounding a welding wire positioned within said gooseneck portion.

14. The welding torch of claim 8, wherein said gooseneck portion of said tube comprises a bend in the range of 30 to 90 degrees.

15. The welding torch of claim 8, wherein said gooseneck portion of said tube comprises a bend in the range of 0 to 68 degrees.

* * * * *